(12) United States Patent
Liu et al.

(10) Patent No.: US 10,778,364 B2
(45) Date of Patent: Sep. 15, 2020

(54) REDUCED POWER CONSUMPTION FOR DIGITAL SIGNAL PROCESSING (DSP)-BASED RECEPTION IN TIME-DIVISION MULTIPLEXING (TDM) PASSIVE OPTICAL NETWORKS (PONS)

(71) Applicant: Futurewei Technologies, Inc., Plano, TX (US)

(72) Inventors: Xiang Liu, Marlboro, NJ (US); Frank Effenberger, Frisco, TX (US); Huaiyu Zeng, Red Bank, NJ (US); Guozhu Long, Fremont, CA (US); Haixiang Liang, Atherton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/916,060

(22) Filed: Mar. 8, 2018

(65) Prior Publication Data

US 2018/0302183 A1    Oct. 18, 2018

Related U.S. Application Data (60) Provisional application No. 62/500,218, filed on May 2, 2017, provisional application No. 62/485,914, filed on Apr. 15, 2017.

(51) Int. Cl.
*H04J 3/16*         (2006.01)
*H04B 10/69*        (2013.01)
(Continued)

(52) U.S. Cl.
CPC .......... *H04J 14/0234* (2013.01); *H04B 10/69* (2013.01); *H04J 3/1652* (2013.01);
(Continued)

(58) Field of Classification Search
CPC .......................... H04B 10/1652; H04J 3/1652
See application file for complete search history.

(56) References Cited

U.S. PATENT DOCUMENTS

| 4,866,739 A | 9/1989 | Agazzi et al. |
| 6,567,484 B1 | 5/2003 | Hirota et al. |
| (Continued) | | |

FOREIGN PATENT DOCUMENTS

| CN | 1825794 A | 8/2006 |
| CN | 101442362 A | 5/2009 |
| (Continued) | | |

OTHER PUBLICATIONS

Sleep Mode for Energy Saving PONs: Advantages and Drawbacks, 2009 IEEE Globecom Workshops, Dec. 28, 2009. (Year: 2009).*

(Continued)

*Primary Examiner* — Nathan M Cors
(74) *Attorney, Agent, or Firm* — Conley Rose, P.C.

(57) ABSTRACT

An ONU comprises a receiver configured to receive a continuous-mode TDMA downstream signal from an OLT; a PD coupled to the receiver and configured to convert the continuous-mode TDMA downstream signal to an electrical signal or an RF signal; an ADC coupled to the PD and configured to convert the electrical signal or the RF signal to a digital signal; and a burst-mode data recovery stage coupled to the ADC and configured to perform data recovery on a segment of the digital signal corresponding to the ONU, the burst-mode data recovery stage comprises a synchronization stage configured to perform synchronization on the segment.

22 Claims, 10 Drawing Sheets

(51) Int. Cl.
*H04J 14/02* (2006.01)
*H04L 7/04* (2006.01)
*H04L 25/03* (2006.01)
*H04Q 11/00* (2006.01)
*H04L 12/28* (2006.01)

(52) U.S. Cl.
CPC ...... *H04J 14/0246* (2013.01); *H04J 14/0282* (2013.01); *H04L 7/042* (2013.01); *H04L 25/03114* (2013.01); *H04Q 11/0067* (2013.01); *H04L 12/2801* (2013.01)

(56) References Cited

U.S. PATENT DOCUMENTS

| | | |
|---|---|---|
| 7,738,602 B2 | 6/2010 | Langenbach et al. |
| 7,961,781 B2 | 6/2011 | Telang et al. |
| 8,068,572 B2 | 11/2011 | Langenbach et al. |
| 8,873,973 B2 | 10/2014 | Komaki et al. |
| 9,432,755 B2 | 8/2016 | Luo et al. |
| 10,038,505 B2 | 7/2018 | Fan |
| 10,153,844 B2 | 12/2018 | Liu et al. |
| 2002/0027689 A1 | 3/2002 | Bartur et al. |
| 2004/0052213 A1 | 3/2004 | Cankaya et al. |
| 2004/0166817 A1 | 8/2004 | Mokhtari et al. |
| 2006/0188046 A1 | 8/2006 | Jain |
| 2007/0196111 A1 | 8/2007 | Shang |
| 2007/0263673 A1 | 11/2007 | Agazzi et al. |
| 2007/0291886 A1 | 12/2007 | Langenbach et al. |
| 2008/0049847 A1 | 2/2008 | Telang et al. |
| 2008/0080657 A1 | 4/2008 | Aziz et al. |
| 2010/0074346 A1 | 3/2010 | Thompson et al. |
| 2010/0221000 A1 | 9/2010 | Yang et al. |
| 2010/0296811 A1* | 11/2010 | Ohira ............... H04L 1/0009 398/72 |
| 2010/0316387 A1* | 12/2010 | Suvakovic ............ H04J 3/1694 398/98 |
| 2011/0008055 A1* | 1/2011 | Effenberger ........ H04B 10/695 398/155 |
| 2011/0200339 A1 | 8/2011 | Komaki et al. |
| 2011/0255866 A1* | 10/2011 | Van Veen ......... H04B 10/07955 398/35 |
| 2012/0045202 A1 | 2/2012 | Jiang et al. |
| 2012/0128377 A1 | 5/2012 | Hatae et al. |
| 2013/0062508 A1 | 3/2013 | Kanter et al. |
| 2014/0029958 A1 | 1/2014 | Takahashi et al. |
| 2014/0147130 A1* | 5/2014 | Poulsen ............... H04B 10/801 398/208 |
| 2014/0286381 A1 | 9/2014 | Shibasaki |
| 2014/0321863 A1* | 10/2014 | Diab .................... H04B 10/516 398/185 |
| 2014/0328602 A1 | 11/2014 | Sakamoto et al. |
| 2015/0180588 A1* | 6/2015 | Marsella ............. H04B 10/616 398/209 |
| 2016/0344540 A1 | 11/2016 | Derras et al. |
| 2016/0373212 A1 | 12/2016 | Ling et al. |
| 2017/0019203 A1 | 1/2017 | Asm et al. |
| 2018/0287706 A1 | 10/2018 | Liu et al. |
| 2019/0074905 A1 | 3/2019 | Liu et al. |
| 2019/0109646 A1 | 4/2019 | Agazzi et al. |

FOREIGN PATENT DOCUMENTS

| | | |
|---|---|---|
| CN | 101604998 A | 12/2009 |
| CN | 102204196 A | 9/2011 |
| CN | 102884735 A | 1/2013 |
| CN | 106330320 A | 1/2017 |
| EP | 3316535 A1 | 5/2018 |
| WO | 2016128065 A1 | 8/2016 |
| WO | WO2016128065 A1 * | 8/2016 ............ H04B 10/61 |

OTHER PUBLICATIONS

Machine Translation and Abstract of Chinese Publication No. CN101604998, dated Dec. 16, 2009, 12 pages.
Machine Translation and Abstract of Chinese Publication No. CN102884735, dated Jan. 16, 2013, 26 pages.
Foreign Communication From a Counterpart Application, PCT/CN2018/081001, English Translation of International Search Report dated Jun. 21, 2018, 5 pages.
Foreign Communication From a Counterpart Application, PCT/CN2018/081001, English Translation of Written Opinion dated Jun. 21, 2018, 5 pages.
Wong, S., et al., "Sleep Mode for Energy Saving PONs: Advantages and Drawbacks," 2009 IEEE Globecom Workshops, Dec. 28, 2009, 6 pages.
Foreign Communication From a Counterpart Application, PCT Application No. PCT/CN2018/079163, English Translation of International Search Report dated May 30, 2018, 5 pages.
Foreign Communication From a Counterpart Application, PCT Application No. PCT/CN2018/079163, English Translation of Written Opinion dated May 30, 2018, 4 pages.
Notice of Allowance dated Aug. 13, 2018, 12 pages, U.S. Appl. No. 15/477,754, filed Apr. 3, 2017.
Nakagawa, J., et al., "10.3-Gb/s Burst-Mode 3R Receiver Incorporating Full AGC Optical Receiver and 82.5-GS/s Over-Sampling CDR for 10G-EPON Systems," IEEE Photonics Technology Letters, vol. 22, No. 7, Apr. 1, 2010, pp. 471-473.
Reichmann, K.C., et al.,"A Symmetric-Rate, Extended-Reach 40Gb/s CWDM-TDMA Pon with Downstream and Upstream SOA-Raman Amplification," Journal of Lightwave Technology, vol. 30, No. 4, Feb. 15, 2012, 8 pages.
Van Praet, C., et al., "Demonstration of Low-Power Bit-Interleaving TDM PON," Optical Society of America, vol. 20, No. 26 / Optics Express, Dec. 10, 2012, pp. B7-B14.
"Linear interpolation," Wikipedia, Feb. 2, 2017, 4 pages.
Office Action dated Jan. 11, 2018, 6 pages, U.S. Appl. No. 15/477,754, filed Apr. 3, 2017.
Office Action dated Feb. 23, 2018, 11 pages, U.S. Appl. No. 15/477,754, filed Apr. 3, 2017.
Liu, et al., "Channel Recovery in Burst-Mode, Time-Division Multiplexing (TDM) Passive Optical Networks (PONs)," U.S. Appl. No. 15/477,754, filed Apr. 3, 2017, 31 pages.
Notice of Allowance dated Jul. 2, 2019, 21 pages, U.S. Appl. No. 16/179,606, filed Nov. 2, 2018.
Srivastava, A., "Toward Green Next-Generation Passive Optical Networks," XP060044899, Visual Communications and Image Processing, Proc. of SPIE, vol. 9388, Jan. 13, 2015, 7 pages.
Foreign Communication From a Counterpart Application, European Application No. 18784723.1, Extended European Search Report dated Nov. 14, 2019, 12 pages.
Foreign Communication From a Counterpart Application, Chinese Application No. 201880004879.3, Chinese Search Report dated Jan. 14, 2020, 2 pages.

* cited by examiner

REDUCED POWER CONSUMPTION FOR DIGITAL SIGNAL PROCESSING (DSP)-BASED RECEPTION IN TIME-DIVISION MULTIPLEXING (TDM) PASSIVE OPTICAL NETWORKS (PONS)

CROSS-REFERENCE TO RELATED APPLICATIONS

This application claims priority to U.S. provisional patent application No. 62/485,914 filed on Apr. 15, 2017 by Futurewei Technologies, Inc. and titled "Reduced Power Consumption for Digital Signal Processing (DSP)-Based Reception in Time-Division Multiplexing (TDM) Passive Optical Networks (PONs)" and U.S. provisional patent application No. 62/500,218 filed on May 2, 2017 by Futurewei Technologies, Inc. and titled "Reduced Power Consumption for Digital Signal Processing (DSP)-Based Reception in Time-Division Multiplexing (TDM) Passive Optical Networks (PONs)," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The disclosure is related to the technical field of optical networks, including PONs such as TDM PONs.

BACKGROUND

A PON is one system for providing network access over the last mile, which is the final portion of a telecommunications network that delivers communication to customers. A PON is a P2MP network comprising an OLT at a CO, ONUs at the user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON may be overlaid on top of a TDM PON. In other words, different wavelengths may be multiplexed together to share a single feeder fiber, and each wavelength may be shared by multiple users using TDM.

SUMMARY

In one embodiment, the disclosure includes an ONU comprising: a receiver configured to receive a continuous-mode TDMA downstream signal from an OLT; a PD coupled to the receiver and configured to convert the continuous-mode TDMA downstream signal to an electrical signal or an RF signal; an ADC coupled to the PD and configured to convert the electrical signal or the RF signal to a digital signal; and a burst-mode data recovery stage coupled to the ADC and configured to perform data recovery on a segment of the digital signal corresponding to the ONU, the burst-mode data recovery stage comprises a synchronization stage configured to perform synchronization on the segment. In some embodiments, the ONU further comprises a MAC configured to provide TDMA burst timing information to the ADC, the synchronization stage, and the burst-mode data recovery stage; the ONU further comprises a clock recovery stage configured to determine a sampling speed of the ADC; the sampling speed is an original signal modulation symbol rate multiplied by an oversampling ratio; the oversampling ratio is m/n, wherein m and n are both positive integers, and wherein m is greater than n; the ADC is further configured to operate in a continuous mode so that it is substantially on or completely on while the ONU is powered on; the ADC is further configured to operate in a burst mode so that it is substantially on or completely on only during time slots assigned to the ONU; the synchronization stage is further configured to perform down-sampling on the segment so the segment has a same sampling speed as a modulation symbol rate of the continuous-mode TDMA downstream signal; the synchronization stage is further configured to further perform the synchronization by comparing the segment with a known sequence assigned to the ONU; the burst-mode data recovery stage further comprises a burst-mode equalization stage coupled to the synchronization stage and configured to perform adaptive equalization on the signal intended for the ONU using an optimum sampling phase; the continuous-mode TDMA downstream signal comprises different modulations formats for the ONU and another ONU; the different modulation formats comprise NRZ and PAM4; the continuous-mode TDMA downstream signal comprises different modulation symbols rates for the ONU and another ONU; the different modulation symbol rates differ by integer factors; the different modulation symbol rates comprise at least two of approximately 12.5 Gbaud, 25 Gbaud, and 50 Gbaud; the continuous-mode TDMA downstream signal comprises different FEC overheads for the ONU and another ONU; the different FEC overheads accommodate different link budgets.

In another embodiment, the disclosure includes a method implemented in an ONU, the method comprising: receiving a continuous-mode TDMA downstream signal from an OLT; converting the continuous-mode TDMA downstream signal to an electrical signal or an RF signal; converting the electrical signal or the RF signal to a digital signal; performing data recovery on a segment of the digital signal corresponding to the ONU; and performing synchronization on the segment.

In yet another embodiment, the disclosure includes an ONU comprising: a PD configured to convert an optical signal to an electrical signal or an RF signal, the optical signal originates from an OLT; an ADC configured to convert the electrical signal or the RF signal to a digital signal; a clock recovery stage coupled to the ADC and configured to perform clock recovery on all of the digital signal; and a burst-mode data recovery stage coupled to the clock recovery stage and configured to perform data recovery on less than all of the digital signal. In some embodiments the burst-mode data recovery stage comprises a burst-mode sampling phase optimization stage coupled to the clock recovery stage and configured to perform phase recovery on a segment of the digital signal corresponding to the ONU to determine an optimum sampling phase; the burst-mode data recovery stage further comprises a burst-mode equalization stage coupled to the burst-mode sampling phase optimization stage and configured to perform adaptive equalization on the segment using the optimum sampling phase; the ADC and the clock recovery stage are configured to operate in a continuous mode; the ADC and the clock recovery stage are configured to operate in a burst mode; the ONU further comprises a MAC coupled to the ADC and the clock recovery stage and configured to provide TDMA burst timing information sufficient for the ADC and the clock recovery stage to determine when to turn on.

In yet another embodiment, the disclosure includes a method comprising: converting an optical signal to an electrical signal or an RF signal; converting the electrical signal or the RF signal to a digital signal; performing clock recovery on all of the digital signal; and performing data recovery on less than all of the digital signal. In some embodiments, performing the data recovery comprises: performing phase recovery on a segment of the digital signal to determine an optimum sampling phase; and performing adaptive equalization on the segment using the optimum sampling phase.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ADC: analog-to-digital converter
AGC: automatic gain control
APD: avalanche PD
ASIC: application-specific integrated circuit
BER: bit error ratio
CDR: clock and data recovery
CO: central office
CPU: central processing unit
dB: decibel(s)
dBm: decibel milliwatts(s)
DML: directly-modulated laser
DSP: digital signal processor
EO: electrical-to-optical
FEC: forward error correction
FFE: feed-forward equalization
FPGA: field-programmable gate array
Gbaud: gigabaud
Gb/s: gigabits per second
GS/s: gigasamples per second
km: kilometer(s)
MAC: media access controller
MSE: mean squared error
NG-PON: next-generation PON
NLC: non-linearity compensation
NRZ: non-return-to-zero
ns: nanosecond(s)
ODN: optical distribution network
OE: optical-to-electrical
OLT: optical line terminal
ONT: optical network terminal
ONU: optical network unit
OOK: on-off keying
PAM-4: four-level pulse-amplitude modulation
PD: photodiode
PON: passive optical network
P2MP: point-to-multipoint
RAM: random-access memory
RF: radio frequency
RN: remote node
ROM: read-only memory
RX: receiver unit
SRAM: static RAM
SSMF: standard single-mode fiber
TCAM: ternary content-addressable memory
TDM: time-division multiplexing
TDMA: time-division multiple access
TIA: transimpedance amplifier
TWDM: time- and wavelength-division multiplexing
TX: transmitter unit
VCO: voltage-controlled oscillator
WDM: wavelength-division multiplexing
μs: microsecond(s).

Figure 1:
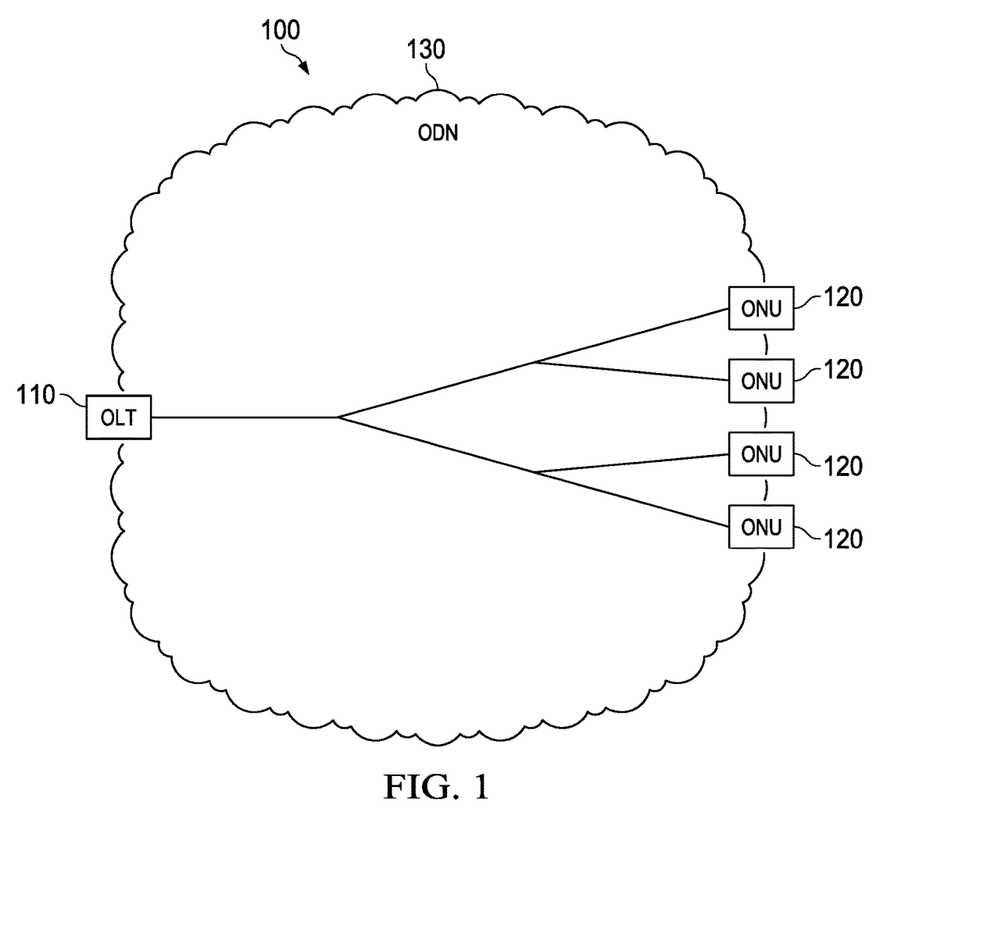
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and ONTs are similar, and the terms may be used interchangeably. The ONUs 120 are typically located at distributed locations such as customer premises, but they may also be located at other suitable locations.

As implementations of the PON 100 improve, receivers in the ONUs 120 may require improved sensitivity, dispersion tolerance, and bandwidth capability. In addition, DSP-based receivers are desirable. However, current DSP-based receivers unnecessarily consume power. Specifically, the OLT 110 transmits a single, continuous signal to all of the ONUs 120. The single, continuous signal may comprise segments, or portions or bursts, intended for multiple ONUs 120. Current DSP-based receivers process the entire signals, not just segments intended for a specific ONU 120. The segments may correspond to discrete periods of time in a scheme such as a TDMA scheme. For instance, when the PON 100 comprises 64 ONUs 120, a DSP-based receiver in one of the ONUs 120 may process 64 times more data than needed and therefore consume about 64 times the amount of power than needed. Such unnecessary power consumption is a constraint for the development and use of DSP-based receivers.

Christophe Van Praet, "Demonstration of low-power bit-interleaving TDM PON," Optics Express, vol. 20, no. 26, Nov. 28, 2012 ("Van Praet"), which is incorporated by reference, avoids DSP-based receivers by using analog receivers in ONTs. However, Van Praet's OLT interleaves data for multiple ONTs, which limits dynamic bandwidth allocation. In addition, Van Praet's ONTs perform CDR before de-interleaving, which means that Van Praet's ONTs perform CDR on entire signals, not just segments intended for specific ONTs. Van Praet's ONTs therefore perform unnecessary processing and thus unnecessarily consume power.

Yuanqiu Luo and Frank Effenberger, U.S. Pat. No. 9,432,755, Aug. 30, 2016 ("Luo"), which is incorporated by reference, also avoids DSP-based receivers. Luo does so by using analog receivers in ONUs instead of ONTs. However, Luo's ONUs perform CDR before burst-mode data processing, which means that, like Van Praet's ONTs, Luo's ONUs also perform CDR on entire signals, not just segments intended for specific ONUs.

Disclosed herein are embodiments for reduced power consumption for DSP-based reception in TDM PONs. The embodiments provide DSP-based reception of continuous-mode TDMA downstream signals within CDR components instead of after CDR components. The CDR components comprise clock recovery stages followed by data recovery stages. The clock recovery stages perform continuous-mode clock recovery of entire signals and do not need data recovery. Alternatively, the clock recovery stages operate in a burst mode manner so that they turn on and off in order to reduce power consumption. The data recovery stages perform low-power, burst-mode data recovery of segments of the signals corresponding to specific ONUs instead of data recovery of all segments of the signals. Because of the TDMA approach, the ONUs are able to separate the segments during the ONUs' designated time slots. By optionally operating the clock recovery stages in a burst mode manner and by performing data recovery of segments of the signals, the embodiments reduce power consumption 10 times to 64 times. The reduced power consumption allows for more powerful DSP techniques such as soft-decision FEC and NLC, which may provide about a 2 dB power budget improvement. In addition, when data recovery stages perform well, the clock recovery stages may be less accurate, which allows a reduction of DSP complexity and thus a further reduction in power consumption. Finally, the TDMA approach allows for different ONUs to receive segments with different modulation formats such as NRZ and PAM-4; different modulation symbol rates such as approximately 12.5 Gbaud, 25 Gbaud, and 50 Gbaud; and different FEC overheads. The different FEC overheads may accommodate different link budgets.

Figure 2:
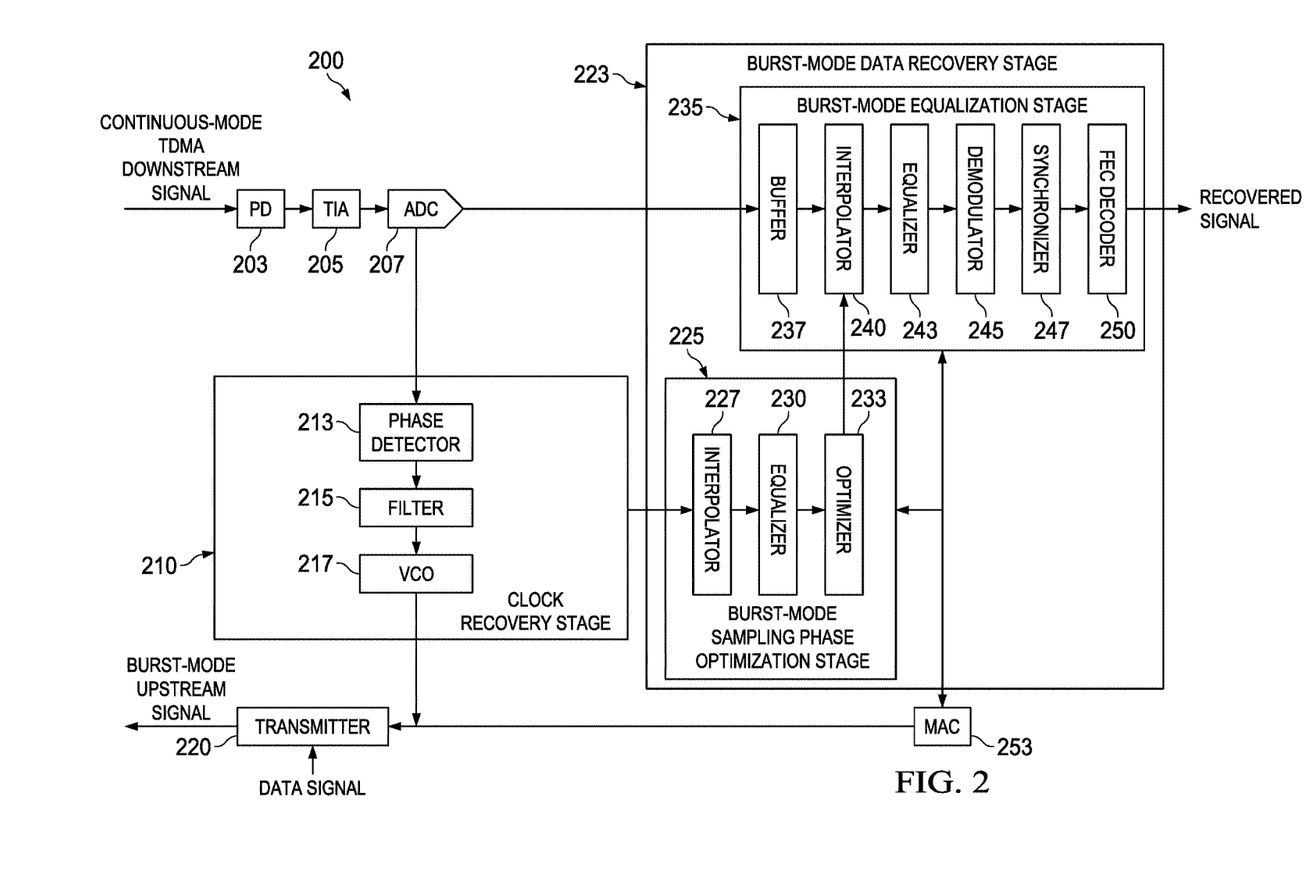
FIG. 2 is a schematic diagram of a transceiver according to an embodiment of the disclosure.

FIG. 2 is a schematic diagram of a transceiver 200 according to an embodiment of the disclosure. The ONUs 120 comprise the transceiver 200, which receives continuous-mode TDMA downstream signals from the OLT 110 and transmits burst-mode upstream signals to the OLT 110. Alternatively, the OLT 110 or another suitable device comprises the transceiver 200. The transceiver 200 performs clock recovery and data recovery in TDM PONs or other suitable networks.

The transceiver 200 generally comprises a PD 203, a TIA 205, an ADC 207, a clock recovery stage 210, a transmitter 220, a burst-mode data recovery stage 223, and a MAC 253. The PD 203 may couple to an input port or receiver port of the transceiver 200, and the transmitter 220 may couple to an output port or transmitter port of the transceiver 200. The clock recovery stage 210 comprises a phase detector 213, a filter 215, and a VCO 217. The burst-mode data recovery stage 223 comprises a burst-mode sampling phase optimization stage 225 and a burst-mode equalization stage 235. The burst-mode sampling phase optimization stage 225 is coupled to the VCO 217 or an output of the clock recovery stage 210 and comprises an interpolator 227, an equalizer 230, and an optimizer 233. The burst-mode equalization stage 235 is coupled to the optimizer 233 or an output of the burst-mode sampling phase optimization stage 225 and comprises a buffer 237, an interpolator 240, an equalizer 243, a demodulator 245, a synchronizer 247, and an FEC decoder 250. Xiang Liu, et al., U.S. patent application Ser. No. 15/477,754, Apr. 3, 2017, which is incorporated by reference, describes a sampling phase optimization stage similar to the burst-mode sampling phase optimization stage 225 and describes an equalization stage similar to the burst-mode equalization stage 235.

In operation, the PD 203 receives from the OLT 110 a continuous-mode TDMA downstream signal, which is an optical signal comprising segments intended for respective ONUs 120. A header precedes each segment. The continuous-mode TDMA downstream signal may be frequency locked with respect to a sampling frequency. The continuous-mode TDMA downstream signal may comprise different modulations formats for different ONUs 120. The different modulation formats may comprise NRZ and PAM4. The continuous-mode TDMA downstream signal may also comprise different modulation symbols rates for different ONUs 120. The different modulation symbol rates may differ by integer factors. For example, the different modulation symbol rates comprise approximately 12.5 Gbaud, 25 Gbaud, and 50 Gbaud. In addition, the OLT 110 may encode the continuous-mode TDMA downstream signal with FEC. The continuous-mode TDMA downstream signal may comprise different FEC overheads for different ONUs 120. The OLT 110 may choose an FEC overhead for a given ONU 120 to meet a link budget requirement of the ONU 120.

The PD 203 converts the continuous-mode TDMA downstream signal to an electrical analog current signal. The TIA 205 amplifies the analog current signal and converts the analog current signal to an analog voltage signal. Optionally, the transceiver 200 comprises an AGC component (not shown) positioned between the TIA 205 and the ADC 207. The AGC component automatically adjusts an amplitude of the analog voltage signal to be suitable for an input range of the ADC 207. The clock recovery stage 210 determines a sampling speed of the ADC 207. The sampling speed may be an original signal modulation symbol rate multiplied by an oversampling ratio m/n, where m and n are both positive integers and m is greater than n. The sampling period is T, which has an arbitrary time unit. T may be one-half of a modulation symbol period of the continuous-mode TDMA downstream signal. The ADC 207 converts the analog voltage signal to a digital signal and passes the digital signal to the clock recovery stage 210. Alternatively, the PD 203 converts the continuous-mode TDMA downstream signal to an RF signal, and the ADC 207 converts the RF signal to a digital signal.

The clock recovery stage 210 performs clock recovery on the entire digital signal, or all of the digital signal. Specifically, the phase detector 213 detects a sampling phase error of the digital signal. The filter 215 is a low-pass filter and filters out quickly-changing errors from the digital signal. The VCO 217 samples the digital signal to synchronize a frequency between the ONU 120 and the OLT 110 to determine a synchronized frequency.

For transmission in the transceiver 200, the transmitter 220 receives the synchronized frequency from the VCO 217 and receives a data signal from the MAC 253 or from another processing component. Using the synchronized frequency and the data signal, the transmitter 220 transmits an optical burst-mode upstream signal to the OLT 110.

For reception in the transceiver 200, generally the burst-mode data recovery stage 223 performs data recovery less than the entire digital signal, or less than all of the digital signal, specifically on a segment of the digital signal corresponding to the ONU 120. The segment may be a time segment corresponding to a period of time. Within the burst-mode data recovery stage 223, the burst-mode sampling phase optimization stage 225 performs phase recovery on the segment to determine an optimum sampling phase, and the burst-mode equalization stage 235 performs adaptive equalization on the segment using the optimum sampling phase. Specifically, in the burst-mode sampling phase optimization stage 225, the interpolator 227 receives the segment from the clock recovery stage 210. The MAC 253 provides TDMA burst timing information sufficient for the interpolator 227 to determine the segment. The interpolator 227 performs interpolation on the segment using 8 calculations to achieve a resolution of T/32 to produce waveforms with different sampling phases. The interpolation may be digital linear interpolation. Alternatively, the interpolator 227 uses another suitable resolution. The interpolator 227 may determine samples according to the following equation:

$$Y_{n,d} = (1-d)Y_{n-1} \pm dY_n, \qquad (1)$$

where $Y_{n,d}$ is an interpolated sample between two samples $Y_{n-1}$ and $Y_n$, n is a sample number, (1−d) is a weight of $Y_{n-1}$, and d is a weight of $Y_n$. The terms (1−d) and d are inversely related to a distance from end points to an intermediate point between sample numbers n−1 and n.

The equalizer 230 equalizes the waveforms to produce equalized waveforms. The equalizer 230 uses pre-stored coefficients from the MAC 253. The pre-stored coefficients are either default coefficients stored in the MAC 253, coefficients determined from a previous continuous-mode TDMA downstream signal from the OLT 110, or coefficients determined from a previous segment of the same continuous-mode TDMA downstream signal. The equalization may be FFE.

The optimizer 233 performs three steps. First, the optimizer 233 determines MSEs for each of the equalized waveforms. Second, the optimizer 233 determines that an optimum sampling phase is a phase of an equalized waveform with a smallest MSE. Alternatively, the optimizer 233 determines that an initial phase is a phase of an equalized waveform with a largest MSE and determines that an optimum sampling phase is the initial phase shifted by T/2 or −T/2. Third, the optimizer 233 passes the optimum sampling phase to the interpolator 240 in the burst-mode equalization stage 235.

In the burst-mode equalization stage 235, the buffer 237 buffers the digital signal from the ADC 207 for a period of time suitable for the burst-mode sampling phase optimization stage 225 to determine the optimum sampling phase, then passes the digital signal to the interpolator 240. The interpolator 240 receives the digital signal from the buffer 237 and performs interpolation on the segment of the digital signal corresponding to the ONU 120 using the optimum sampling phase and a resolution of T/N to produce an interpolated signal. The interpolation may be digital linear interpolation. N is an integer greater than 3, such as 32, for instance. Alternatively, the interpolator 240 uses another suitable resolution. The interpolator 240 may determine samples according to equation (1).

The equalizer 243 adaptively equalizes the interpolated signal to produce an equalized signal. The equalizer 243 adapts equalizer coefficients by comparing an equalized signal waveform to a target waveform. In an initial pass, the equalizer 243 uses pre-stored coefficients from the MAC 253. The pre-stored coefficients are default coefficients stored in the MAC 253 or coefficients determined from a previous burst signal from the ONU 120. The equalization may be FFE. Upon completion of equalization, the equalizer 243 passes its final coefficients, or equalization stage coefficients, to the MAC 253, and the MAC 253 stores the equalization stage coefficients for equalization of subsequent continuous-mode TDMA downstream signals from the OLT 110 or subsequent segments of the same continuous-mode TDMA downstream signal. The equalizer 243 then updates the final coefficients for each subsequent continuous-mode TDMA downstream signal from the OLT 110 and each subsequent segment of the same continuous-mode TDMA downstream signal. The equalizer 243 may comprise an NLC component that performs NLC. Alternatively, the NLC component is positioned between the equalizer 243 and the demodulator 245.

The demodulator 245 demodulates the equalized signal to produce a demodulated signal. The synchronizer 247 performs synchronization using cross-correlation with a known header pattern. Alternatively, the synchronizer 247 is located after the FEC decoder 250. The FEC decoder 250 performs FEC decoding on the demodulated signal to produce a recovered signal. The FEC decoding may be hard-decision decoding or soft-decision decoding. Alternatively, the demodulator 245 and the FEC decoder 250 are outside the burst-mode equalization stage 235 and elsewhere within the burst-mode data recovery stage 223. Finally, the transceiver 200 may perform further processing on the recovered signal. In addition, using the equalization stage coefficients stored in the MAC 253, the transceiver 200 may perform channel recovery on subsequent continuous-mode TDMA downstream signals from the OLT 110.

The ADC 207 and the clock recovery stage 210 operate in a continuous mode so that they are substantially on or completely on while the transceiver 200 specifically, or the ONU 120 generally, is powered on. Alternatively, the ADC 207 and the clock recovery stage 210 operate in a burst mode so that they may be substantially off or completely off for periods of time, for instance during time slots not assigned to the ONU 120, then turn substantially on or completely on, for instance during time slots assigned to the ONU 120. In this context, substantially off means that all unnecessary gates or other sub-components are off, and substantially on means that all necessary gates or other sub-components are on. In order for upstream signals to have the same clock frequency as downstream signals, the ADC 207 and the clock recovery stage 210 may turn substantially on or completely on when transmitting the upstream signals. The MAC 253 provides TDMA burst timing information sufficient for the ADC 207 and the clock recovery stage 210 to determine when to turn on for receiving the downstream signals and for transmitting the upstream signals. Thus, though not shown, the MAC 253 may be coupled to the ADC 207.

FIGS. 3A-3D, 4A-4D, 5A-5D, and 6 are graphs showing results from an experimental system. The experimental system comprises a transceiver similar to the transceiver 200. The transceiver receives from a 10 Gb/s continuous-mode DML or APD transmitter a 25 Gb/s OOK signal over a 20 km SSMF. FIGS. 3A-3D and 4A-4D are similar, but FIGS. 3A-3D demonstrate first measurements and 4A-4D demonstrate second measurements.

Figure 3A:
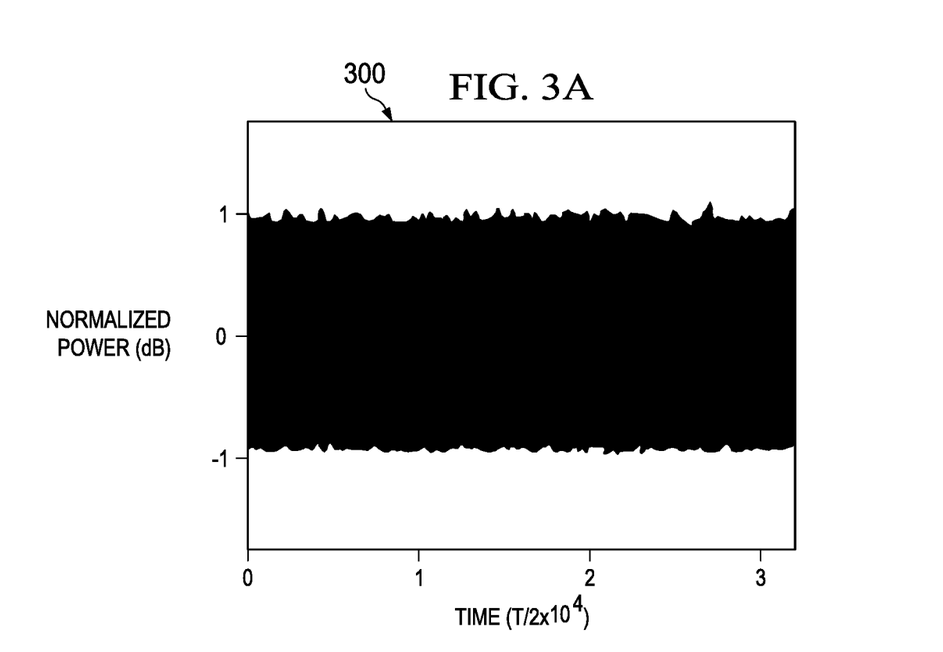
FIG. 3A is a graph of a continuous-mode TDMA downstream signal.

FIGS. 3A-3D reflect a received optical signal power of −21 dBm. FIG. 3A is a graph 300 of a continuous-mode TDMA downstream signal. The x-axis represents time in µs, and the y-axis represents normalized power in dB. The graph 300 shows that the continuous-mode TDMA downstream signal does not have distinguishable segments in the time scale shown.

Figure 3B:
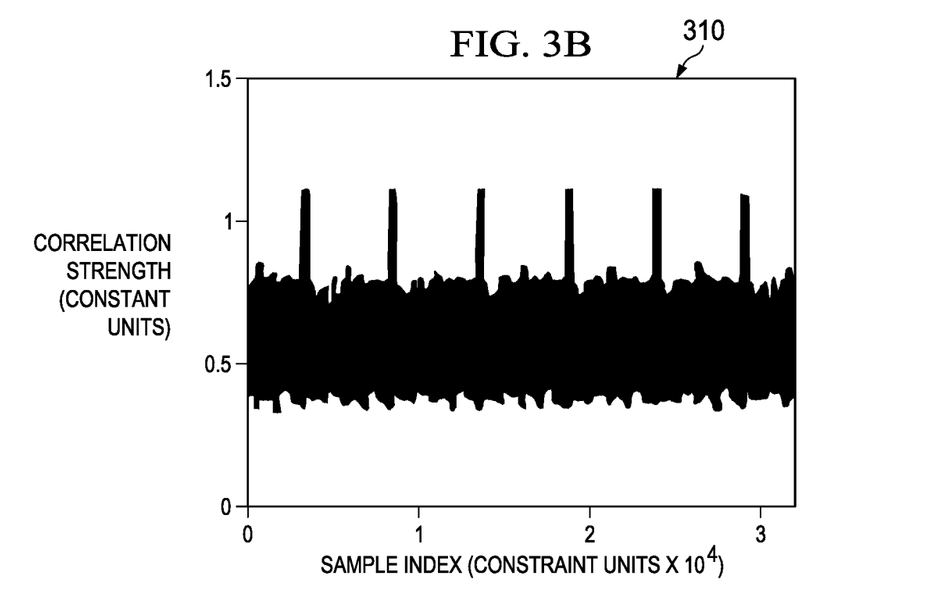
FIG. 3B is a graph of a correlation between a sampled continuous-mode TDMA downstream signal and a known header pattern assigned to each segment.

FIG. 3B is a graph 310 of a correlation between a sampled continuous-mode TDMA downstream signal and a known header pattern assigned to each segment. The x-axis represents a sample index in constant units multiplied by a factor of $10^4$, and the y-axis represents a correlation strength in constant units. The sampled continuous-mode TDMA downstream signal is a sampled version of the continuous-mode TDMA downstream signal in the graph 300. The graph 310 shows that a header of the sampled continuous-mode TDMA downstream signal, which corresponds to the sharp peak at about $0.3 \times 10^4$, has a stronger correlation strength than a payload of the continuous-mode TDMA downstream signal, which corresponds to the portion from about $0.3 \times 10^4$ to $0.9 \times 10^4$.

Figure 3C:
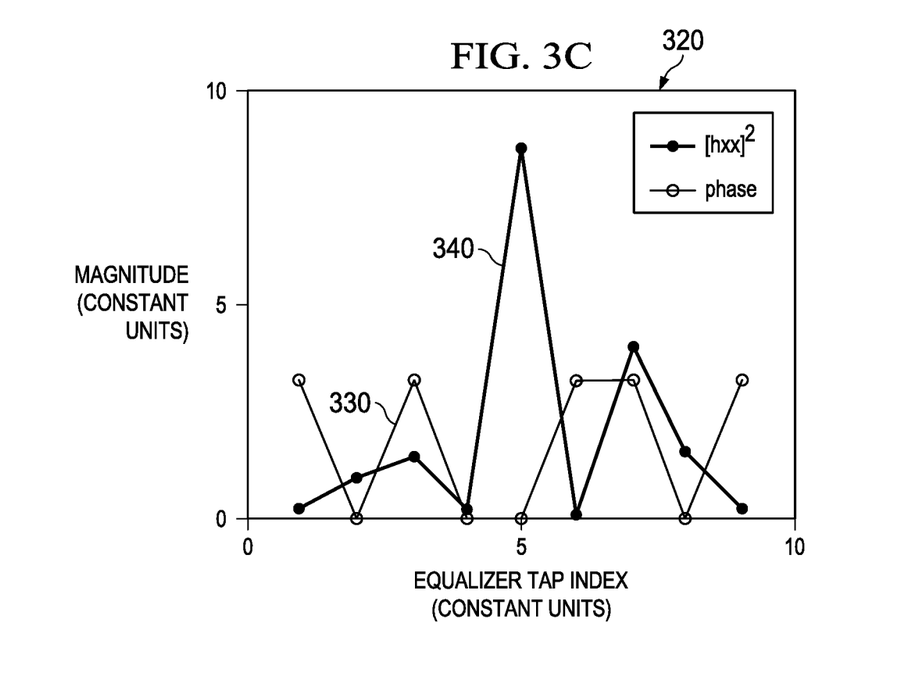
FIG. 3C is a graph of equalizer coefficients.

FIG. 3C is a graph 320 of equalizer coefficients. The x-axis represents an equalizer tap index in constant units, and the y-axis represents a magnitude in constant units. The graph 320 comprises a first curve 330 marked with squares and corresponding to a phase angle of the equalizer coefficients for the burst-mode equalization stage 235 and comprises a second curve 340 marked with circles and corresponding to a square of absolute values of equalizer coefficients for the burst-mode sampling phase optimization stage 225. The graph 320 shows that the equalizer coefficients are well converged.

Figure 3D:
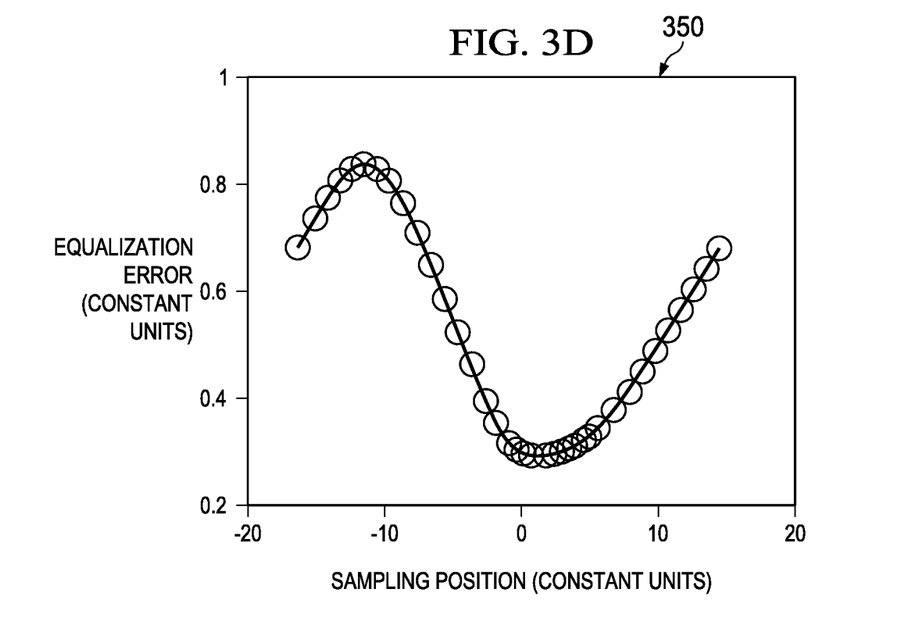
FIG. 3D is a graph of equalization error as a function of sampling position.

FIG. 3D is a graph 350 of equalization error as a function of sampling position. The x-axis represents a sampling position in constant units, and the y-axis represents an equalization error in constant units. The graph 350 is sinusoidal with a period equivalent to T. For that reason, a resolution of at least T/4 may be needed to reliably determine an optimal sampling phase. The graph 350 shows that an optimum sampling phase is at sampling position 2, which is where the equalization error is at its lowest level of about 0.3.

Figure 4A:
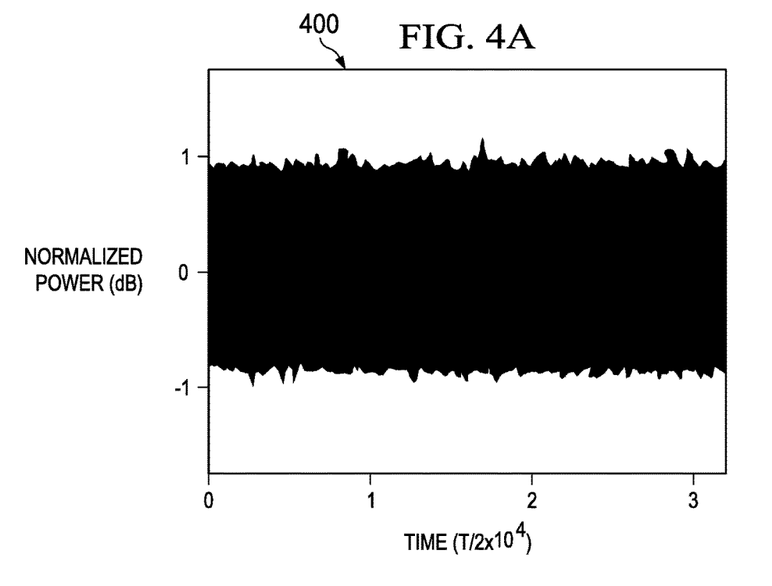
FIG. 4A is another graph of a continuous-mode TDMA downstream signal.
Figure 4B:
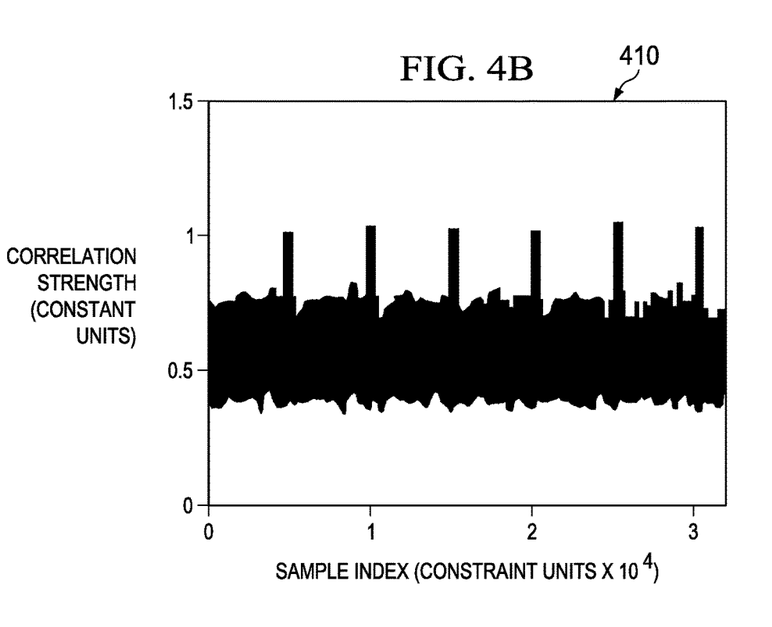
FIG. 4B is another graph of a correlation between a sampled continuous-mode TDMA downstream signal and another known header pattern assigned to each segment.
Figure 4C:
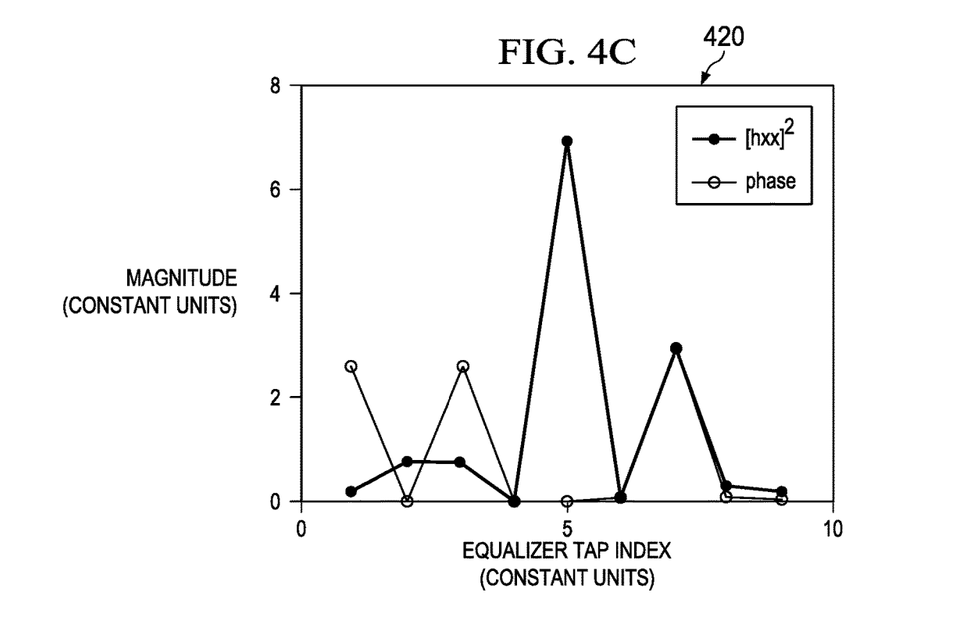
FIG. 4C is another graph of equalizer coefficients.
Figure 4D:
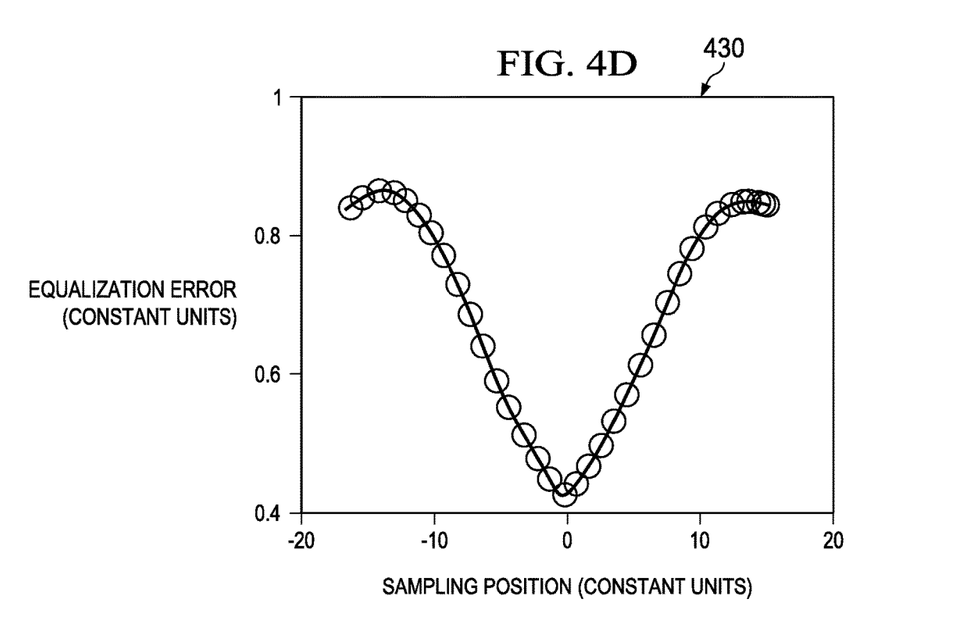
FIG. 4D is another graph of equalization error as a function of sampling position.

FIGS. 4A-4D are similar to FIGS. 3A-3D, respectively, but reflect a lower received optical signal power of −26 dBm instead of −21 dBm. Thus, FIGS. 4A-4D reflect more noise in the received optical signal. FIG. 4A is another graph 400 of a continuous-mode TDMA downstream signal. FIG. 4B is another graph 410 of a correlation between a sampled continuous-mode TDMA downstream signal and a known header pattern assigned to each segment. FIG. 4C is another graph 420 of equalizer coefficients. FIG. 4D is another graph 430 of equalization error as a function of sampling position. The graph 430 shows that an optimum sampling phase is at sampling position 0, which is where the equalization error is at its lowest level of about 0.4, which is consistent with the reduced optical signal power.

Figure 5:
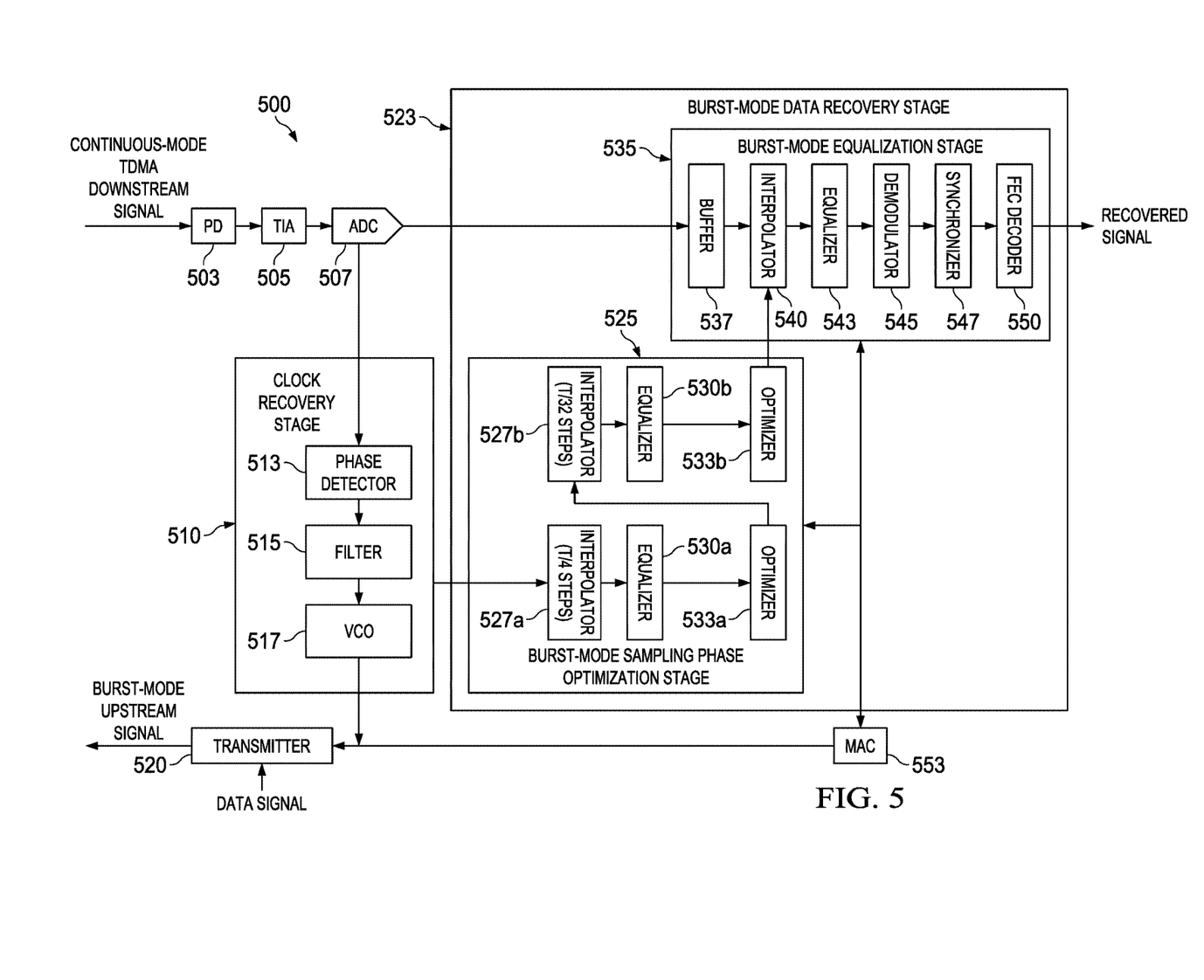
FIG. 5 is a schematic diagram of a transceiver according to another embodiment of the disclosure.

FIG. 5 is a schematic diagram of a transceiver 500 according to another embodiment of the disclosure. The transceiver 500 is similar to the transceiver 200. Like the transceiver 200, the transceiver 500 generally comprises a PD 503, a TIA 505, an ADC 507, a clock recovery stage 510, a transmitter 520, a burst-mode data recovery stage 523, and a MAC 553. Also like the transceiver 200, the clock recovery stage 510 comprises a phase detector 513, a filter 515, and a VCO 517; the burst-mode data recovery stage 523 comprises a burst-mode sampling phase optimization stage 525 and a burst-mode equalization stage 535; and the burst-mode equalization stage 535 comprises a buffer 537, an interpolator 540, an equalizer 543, a demodulator 545, a synchronizer 547, and an FEC decoder 550. However, unlike the transceiver 200, which comprises one interpolator 227, one equalizer 230, and one optimizer 233 in the burst-mode sampling phase optimization stage 225, the transceiver 500 comprises two interpolators 527a, 527b; two equalizers 530a, 530b; and two optimizers 533a, 533b in the burst-mode sampling phase optimization stage 525.

The interpolator 527a, the equalizer 530a, and the optimizer 533a perform coarse phase optimization, and the interpolator 527b, the equalizer 530b, and the optimizer 533b perform fine phase optimization. Specifically, the interpolator 527a performs interpolation on the segment using a resolution of T/4 to produce waveforms with different phases. The interpolator 527b then performs digital linear interpolation on the portion using a resolution of T/32 to produce waveforms with different phases. The interpolation may be digital linear interpolation. Thus, in this context, coarse phase optimization and fine phase optimization indicate a relative relationship to each other so that fine phase optimization occurs at a finer, or smaller, resolution than coarse phase optimization. Alternatively, the interpolators 527a, 527b use other suitable resolutions. Compared to the transceiver 200, the transceiver 500 performs phase optimization marginally slower, but does so by using less processing power at any given time.

Figure 6:
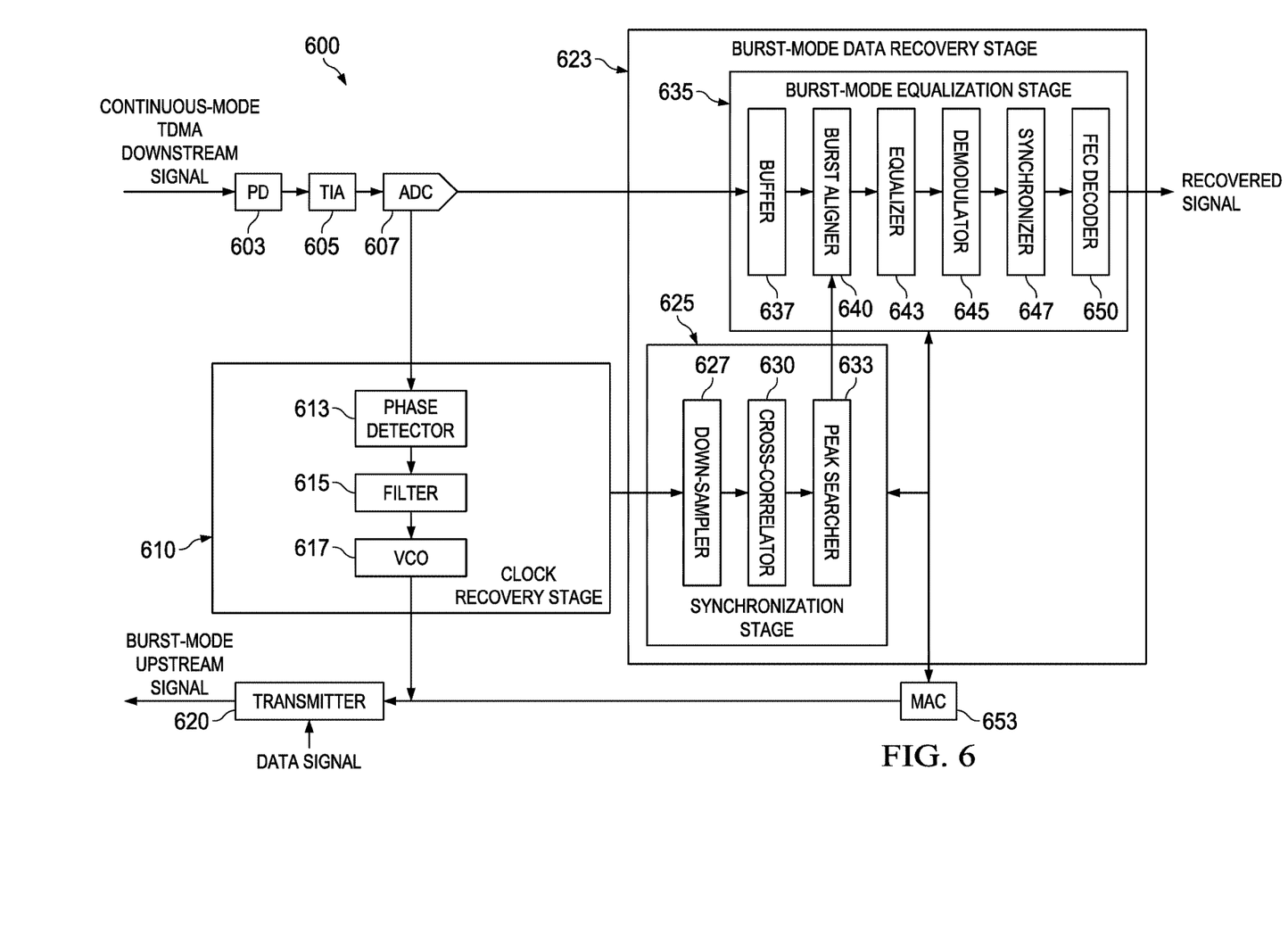
FIG. 6 is a schematic diagram of a transceiver according to yet another embodiment of the disclosure.

FIG. 6 is a schematic diagram of a transceiver 600 according to yet another embodiment of the disclosure. The transceiver 600 is similar to the transceiver 200. Like the transceiver 200, the transceiver 600 generally comprises a PD 603, a TIA 605, an ADC 607, a clock recovery stage 610, a transmitter 620, a burst-mode data recovery stage 623, and a MAC 653. Also like the transceiver 200, the clock recovery stage 610 comprises a phase detector 613, a filter 615, and a VCO 617; the burst-mode data recovery stage 623 comprises a burst-mode equalization stage 635; and the burst-mode equalization stage 635 comprises a buffer 637, an equalizer 643, a demodulator 645, a synchronizer 647, and an FEC decoder 650. However, unlike the transceiver 200, the burst-mode data recovery stage 623 comprises a burst aligner 640 positioned between the buffer 637 and the equalizer 643. In addition, unlike the transceiver 200, the transceiver 600 comprises a synchronization stage 625 instead of a burst-mode sampling phase optimization stage 225.

The synchronization stage 625 comprises a down-sampler 627, a cross-correlator 630, and a peak searcher 633. The down-sampler 627 receives from the clock recovery stage 610 a segment of the digital signal corresponding to the ONU 120, and the down-sampler 627 performs down-sampling on the segment so the segment has a same sampling speed as a modulation symbol rate of the continuous-mode TDMA downstream signal. The cross-correlator 630 performs cross-correlation by comparing the segment with a known sequence assigned to the ONU 120. The peak searcher 633 finds a cross-correlation peak to identify a starting position of each signal segment or signal burst intended for the ONU 120. Together, the cross-correlator 630 and the peak searcher 633 perform synchronization by comparing the segment with a known sequence assigned to the ONU 120. The MAC 653 provides burst timing information and the known sequence to the synchronization stage 625. The synchronization stage 625 passes an output to the burst aligner 640 in order for the burst aligner 640 to perform burst alignment.

Figure 7:
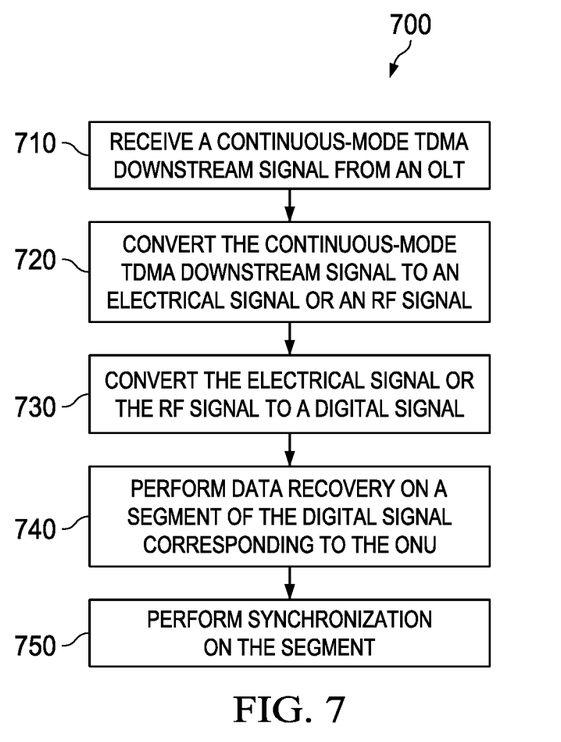
FIG. 7 is a flowchart illustrating a method of CDR according to an embodiment of the disclosure.

FIG. 7 is a flowchart illustrating a method 700 of CDR according to an embodiment of the disclosure. The transceiver 600 performs the method 700 in some embodiments. At step 710, a continuous-mode TDMA downstream signal is received from an OLT. For instance, the transceiver 600 in the ONU 120 receives the continuous-mode TDMA downstream signal from the OLT 110. At step 720, the continuous-mode TDMA downstream signal is converted to an electrical signal or an RF signal. For instance, the PD 603 converts the continuous-mode TDMA downstream signal into the electrical signal or the RF signal. At step 730, the electrical signal or the RF signal is converted to a digital signal. For instance, the ADC 607 converts the electrical signal or the RF signal to the digital signal. At step 740, data recovery is performed on a segment of the digital signal corresponding to the ONU. For instance, the burst-mode data recovery stage 623 performs data recovery on a segment of the digital signal corresponding to the ONU 120. Finally, at step 750, synchronization is performed on the segment. For instance, the synchronization stage 625 performs synchronization on the segment.

Figure 8:
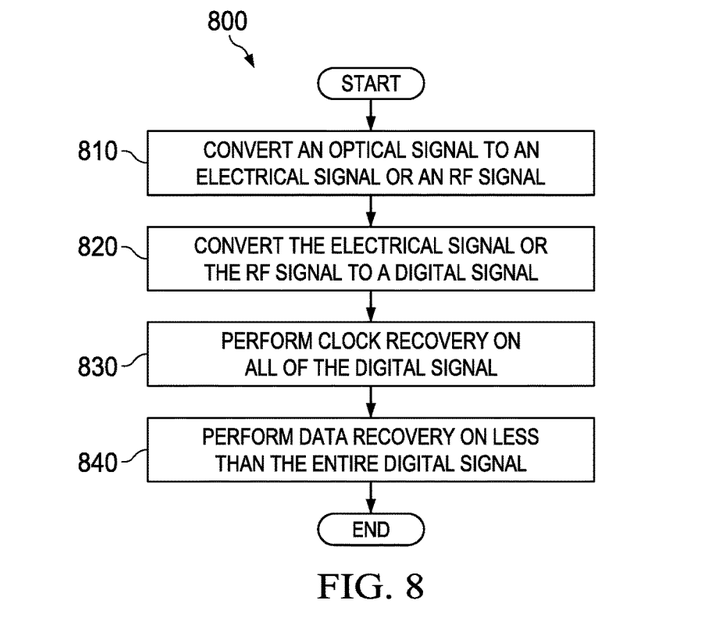
FIG. 8 is a flowchart illustrating a method of CDR according to another embodiment of the disclosure.

FIG. 8 is a flowchart illustrating a method 800 of CDR according to another embodiment of the disclosure. The transceivers 200, 500 perform the method 800 in some embodiments. At step 810, an optical signal is converted to an electrical signal or an RF signal. For instance, the PDs 203, 503 convert a continuous-mode TDMA downstream signal from the OLT 110 into the electrical signal or the RF signal. At step 820, the electrical signal or the RF signal is converted to a digital signal. For instance, the ADCs 207, 507 convert the electrical signal or the RF signal to the digital signal. At step 830, clock recovery is performed on all of the digital signal. For instance, the clock recovery stages 210, 510 perform the clock recovery. Finally, at step 840, data recovery is performed on less than all of the digital signal. For instance, the burst-mode data recovery stages 223, 523 perform the data recovery. Specifically, the burst-mode sampling phase optimization stages 225, 525 perform phase recovery on a segment of the digital signal to determine an optimum sampling phase, and the burst-mode equalization stages 235, 535 perform adaptive equalization on the segment using the optimum sampling phase.

Figure 9:
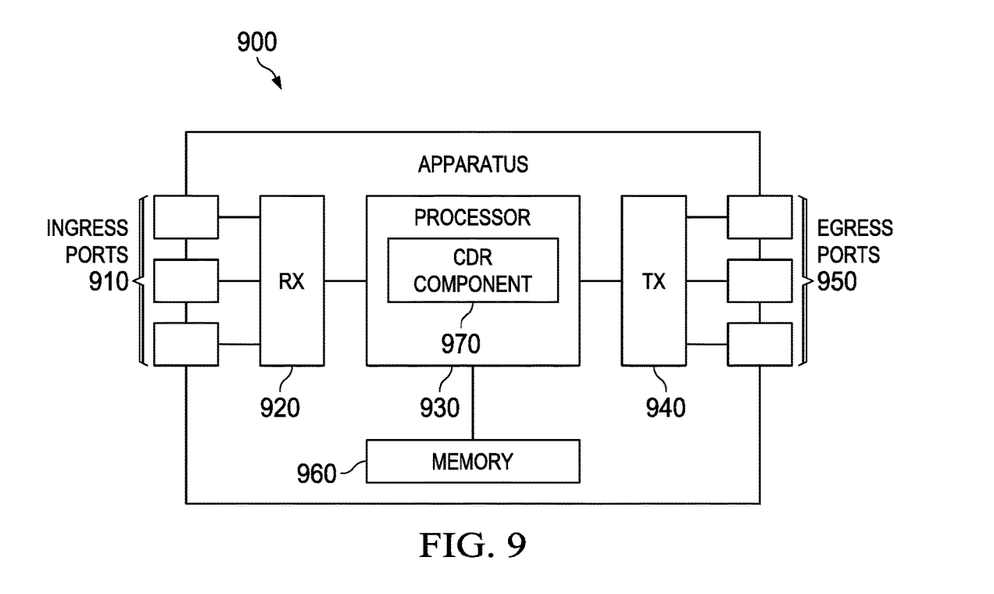
FIG. 9 is a schematic diagram of an apparatus according to an embodiment of the disclosure.

FIG. 9 is a schematic diagram of an apparatus 900 according to an embodiment of the disclosure. The apparatus 900 may implement the disclosed embodiments. The apparatus 900 comprises ingress ports 910 and an RX 920 for receiving data; a processor, logic unit, baseband unit, or CPU 930 to process the data; a TX 940 and egress ports 950 for transmitting the data; and a memory 960 for storing the data. The apparatus 900 may also comprise OE components, EO components, or RF components coupled to the ingress ports 910, the RX 920, the TX 940, and the egress ports 950 for ingress or egress of optical, electrical signals, or RF signals.

The processor 930 is any combination of hardware, middleware, firmware, or software. The processor 930 comprises any combination of one or more CPU chips, cores, FPGAs, ASICs, or DSPs. The processor 930 communicates with the ingress ports 910, the RX 920, the TX 940, the egress ports 950, and the memory 960. The processor 930 comprises a CDR component 970, which implements the disclosed embodiments. The inclusion of the CDR component 970 therefore provides a substantial improvement to the functionality of the apparatus 900 and effects a transformation of the apparatus 900 to a different state. Alternatively, the memory 960 stores the CDR component 970 as instructions, and the processor 930 executes those instructions.

The memory 960 comprises any combination of disks, tape drives, or solid-state drives. The apparatus 900 may use the memory 960 as an over-flow data storage device to store programs when the apparatus 900 selects those programs for execution and to store instructions and data that the apparatus 900 reads during execution of those programs. The memory 960 may be volatile or non-volatile and may be any combination of ROM, RAM, TCAM, or SRAM.

An ONU comprises: a receiving element configured to receive a continuous-mode TDMA downstream signal from an OLT; a PD element coupled to the receiving element and configured to convert the continuous-mode TDMA downstream signal to an electrical signal or an RF signal; an analog-to-digital converting element coupled to the PD element and configured to convert the electrical signal or the RF signal to a digital signal; and a burst-mode data recovery stage coupled to the ADC and configured to perform data recovery on a segment of the digital signal corresponding to the ONU, the burst-mode data recovery stage comprises a synchronization stage configured to perform synchronization on the segment.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical network unit (ONU) comprising:
   a receiver configured to receive a continuous-mode time-division multiple access (TDMA) downstream signal from an optical line terminal (OLT);
   a photodiode (PD) coupled to the receiver and configured to convert the continuous-mode TDMA downstream signal to an electrical signal or a radio frequency (RF) signal;
   an analog-to-digital converter (ADC) coupled to the PD and configured to convert the electrical signal or the RF signal to a digital signal;
   a burst-mode data recovery stage coupled to the ADC and configured to perform data recovery on a segment of the digital signal corresponding to the ONU, the burst-mode data recovery stage comprising a synchronization stage configured to perform synchronization on the segment; and
   a media access controller (MAC) configured to provide TDMA burst timing information to the ADC, the synchronization stage, and the burst-mode data recovery stage.

2. The ONU of claim 1, wherein the ADC is further configured to operate in a continuous mode so that it is substantially on or completely on while the ONU is powered on.

3. The ONU of claim 1, wherein the ADC is further configured to operate in a burst mode so that it is substantially on or completely on only during time slots assigned to the ONU.

4. The ONU of claim 1, wherein the synchronization stage is further configured to perform down-sampling on the segment so the segment has a same sampling speed as a modulation symbol rate of the continuous-mode TDMA downstream signal.

5. The ONU of claim 1, wherein the synchronization stage is further configured to further perform the synchronization by comparing the segment with a known sequence assigned to the ONU.

6. The ONU of claim 1, wherein the burst-mode data recovery stage further comprises a burst-mode equalization stage coupled to the synchronization stage and configured to perform adaptive equalization on the signal intended for the ONU using an optimum sampling phase.

7. The ONU of claim 1, wherein the continuous-mode TDMA downstream signal comprises different modulation formats for the ONU and another ONU.

8. The ONU of claim 7, wherein the different modulation formats comprise non-return-to-zero (NRZ) and four-level pulse-amplitude modulation (PAM4).

9. The ONU of claim 1, wherein the continuous-mode TDMA downstream signal comprises different modulation symbol rates for the ONU and another ONU.

10. The ONU of claim 9, wherein the different modulation symbol rates differ by integer factors.

11. The ONU of claim 10, wherein the different modulation symbol rates comprise at least two of approximately 12.5 gigabaud (Gbaud), 25 Gbaud, and 50 Gbaud.

12. The ONU of claim 1, wherein the continuous-mode TDMA downstream signal comprises different forward error correction (FEC) overheads for the ONU and another ONU.

13. The ONU of claim 12, wherein the different FEC overheads accommodate different link budgets.

14. An optical network unit (ONU) comprising:
   a receiver configured to receive a continuous-mode time-division multiple access (TDMA) downstream signal from an optical line terminal (OLT);
   a photodiode (PD) coupled to the receiver and configured to convert the continuous-mode TDMA downstream signal to an electrical signal or a radio frequency (RF) signal;
   an analog-to-digital converter (ADC) coupled to the PD and configured to convert the electrical signal or the RF signal to a digital signal;
   a burst-mode data recovery stage coupled to the ADC and configured to perform data recovery on a segment of the digital signal corresponding to the ONU, the burst-mode data recovery stage comprising a synchronization stage configured to perform synchronization on the segment; and
   a clock recovery stage configured to determine a sampling speed of the ADC.

15. The ONU of claim 14, wherein the sampling speed is an original signal modulation symbol rate multiplied by an oversampling ratio.

16. The ONU of claim 15, wherein the oversampling ratio is m/n, wherein m and n are both positive integers, and wherein m is greater than n.

17. An optical network unit (ONU) comprising: a photodiode (PD) configured to convert an optical signal to an electrical signal, the optical signal originates from an optical line terminal (OLT); an analog-to-digital converter (ADC) configured to convert the electrical signal to a digital signal; a dock recovery stage coupled to the ADC and configured to perform dock recovery on all of the digital signal; and a burst-mode data recovery stage coupled to the dock recovery stage and configured to perform data recovery on less than all of the digital signal.

18. The ONU of claim 17, wherein the burst-mode data recovery stage comprises a burst-mode sampling phase optimization stage coupled to the clock recovery stage and configured to perform phase recovery on a segment of the digital signal corresponding to the ONU to determine an optimum sampling phase.

19. The ONU of claim 18, wherein the burst-mode data recovery stage further comprises a burst-mode equalization stage coupled to the burst-mode sampling phase optimization stage and configured to perform adaptive equalization on the segment using the optimum sampling phase.

20. The ONU of claim 17, wherein the ADC and the clock recovery stage are configured to operate in a continuous mode.

21. The ONU of claim 17, wherein the ADC and the clock recovery stage are configured to operate in a burst mode.

22. The ONU of claim 21, further comprising a media access controller (MAC) coupled to the ADC and the clock recovery stage and configured to provide time-division multiple access (TDMA) burst timing information sufficient for the ADC and the clock recovery stage to determine when to turn on.

* * * * *

UNITED STATES PATENT AND TRADEMARK OFFICE
CERTIFICATE OF CORRECTION

PATENT NO. : 10,778,364 B2
APPLICATION NO. : 15/916060
DATED : September 15, 2020
INVENTOR(S) : Xiang Liu et al.

Page 1 of 1

It is certified that error appears in the above-identified patent and that said Letters Patent is hereby corrected as shown below:

In the Claims

Column 13, Lines 47-66, Claim 1, should read:
1. An optical network unit (ONU) comprising: a receiver configured to receive a continuous-mode time-division multiple access (TDMA) downstream signal from an optical line terminal (OLT); a photodiode (PD) coupled to the receiver and configured to convert the continuous-mode TDMA downstream signal to an electrical signal; an analog-to-digital converter (ADC) coupled to the PD and configured to convert the electrical signal to a digital signal; and a burst-mode data recovery stage coupled to the ADC and configured to perform data recovery on a segment of the digital signal corresponding to the ONU, the burst-mode data recovery stage comprising a synchronization stage configured to perform synchronization on the segment.

Signed and Sealed this
Third Day of November, 2020

Andrei Iancu
*Director of the United States Patent and Trademark Office*